United States Patent [19]

Chadima, Jr. et al.

[11] 3,839,625

[45] Oct. 1, 1974

[54] SCANNER TEMPLATE

[75] Inventors: George E. Chadima, Jr., Cedar Rapids; Keith Wallace, Marion; Gary Peyton, Cedar Rapids, all of Iowa

[73] Assignee: Norand Corporation, Cedar Rapids, Iowa

[22] Filed: Aug. 2, 1973

[21] Appl. No.: 385,162

[52] U.S. Cl. .................... 235/61.12 N, 235/61.11 E

[51] Int. Cl. ........................ G06k 19/06, G06k 7/10

[58] Field of Search ........................ 235/61.12 N, 235/61.11 R, 61.11 A, 61.11 B, 61.11 C, 61.11 D, 61.11 E, 61.7 R, 61.6 E; 35/48 R, 48 A, 48 B, 27, 37

[56] References Cited

UNITED STATES PATENTS

| | | | |
|---|---|---|---|
| 2,525,837 | 10/1950 | Simplair | 35/48 A |
| 2,919,498 | 1/1960 | Hill | 35/48 R |
| 3,054,196 | 9/1962 | Durham | 35/48 R |
| 3,526,755 | 9/1970 | Campbell et al. | 235/61.11 E |

*Primary Examiner*—Daryl W. Cook

*Attorney, Agent, or Firm*—Hill, Gross, Simpson, Van Santen, Steadman, Chiara & Simpson

[57] ABSTRACT

A template to aid in the rapid scanning of bar code labels associated with specific items of a material order list. In the booklet form of template, the front cover of the booklet is formed of a transparent material and includes two separate sheets between which bar code labels may be inserted. The front cover is caused to overlie a material order list which is located between the front and back covers. The material order list is removably positioned and may be marked by hand and positioned within the booklet. When the booklet is closed, the front cover with the bar code labels is caused to overlie the material order list in such a way that the quantity ordered is visibly displayed through the transparent front cover. The front cover has windows corresponding to each item to be ordered which act as a guide for the scanner. A related easel type arrangement is also disclosed.

9 Claims, 5 Drawing Figures

PATENTED OCT 1 1974

3,839,625

SCANNER TEMPLATE

BACKGROUND OF THE INVENTION

1. Description of the Prior Art

The use of bar codes to identify material to be ordered as well as quantity is well known in the art. However, when large numbers of different types of materials are to be ordered in rapid succession the scanning of individual bar codes for each material and each quantity become a challenge to the dexterity of the person doing the scanning. Errors can result from fatigue or a lack of required scanning precision. 2. Field of the Invention The field of art which is this invention pertains is electronic scanning devices and in particular to mechanical aids to assist a person scanning a material order list to improve the accuracy and reliability of the scanner imput.

SUMMARY OF THE INVENTION

It is an important feature of the present invention to provide an improved method for scanning bar codes associated with a material order list.

It is another feature of the present invention to provide a device to guide a manual scanner across a bar code label associated with closely positioned items on a material order list.

It is a principle object of the present invention to provide a template for a bar code scanner.

It is another object of the present invention to provide a template having a plurality of individual elongated windows which are readily positionable adjacent to items on a material order list and wherein respective bar codes are located within each window.

It is another object of the present invention to provide a bar code template booklet having means for positioning a material order list within the booklet, having means for locating bar codes adjacent to each one of the items on the material order list and having transparent means for displaying a portion of the material order list through the front cover so as to enable the user to selectively scan only desired items on the material list.

It is also an object of the present invention to provide a bar code scanner booklet in the form of an easal wherein a transparent plate has a series of elongated windows positioned above respective ones of bar code labels and wherein printed indicia are located adjacent each one of the windows to identify the item to be scanned.

These and other objects, features, and advantages of the present invention will be understood in greater detail from the following description and the associated drawings wherein reference numerals are utilized to designate preferred embodiments.

DESCRIPTION OF THE PREFERRED EMBODIMENT

Optical scanning of bar code labels is becoming accepted as a means for speeding ordering time. By using a bar code to represent both an item on an order list and a quantity to be ordered, a person placing an order need only pass an optical scanner over the code and quantity indications on a bar code label to enter the order in an order entry system. The value of such a system becomes clear when a number of items being ordered reaches large proportions. An optical scanner of the type which may be used in such a system is disclosed in my copending application Ser. No. 223.112 filed: Feb. 3, 1972, now abandoned.

In the above mentioned application, an optical scanning device is used to scan a bar code composed of wide black, wide white, narrow black and a narrow white bars positioned adjacent to one another to indicate alpha-numeric data. When the respective bar code label is scanned, the data representing the item and the quantity is automatically entered in the system in digital form for subsequent rapid transmission over telephone lines to a central warehouse or central ordering location.

Apresent such ordering systems are employed in chain grocery stores, for instance, where bar code labels are positioned on the shelves adjacent to respective products. When it is desired to place an order, an ordering attendant merely makes the rounds of the shelves and optically scans the bar code label adjacent each item to be ordered. The quantity is entered manually and the entire order is accumulated in a bulk storage unit for later transmission.

However, it is often deisrable to be able to place such an order from a material order list while sitting at a desk, rather than actually making the rounds of the shelves. The difficulty of accurately scanning a bar code label, however, increases where many bar code labels are positioned adjacent one another on a flat sheet.

Accordingly, the present invention provides a means to increase the scanning speed of a material list and to also increase the accuracy of the data entry.

Figures 1, 2, 3, 4:
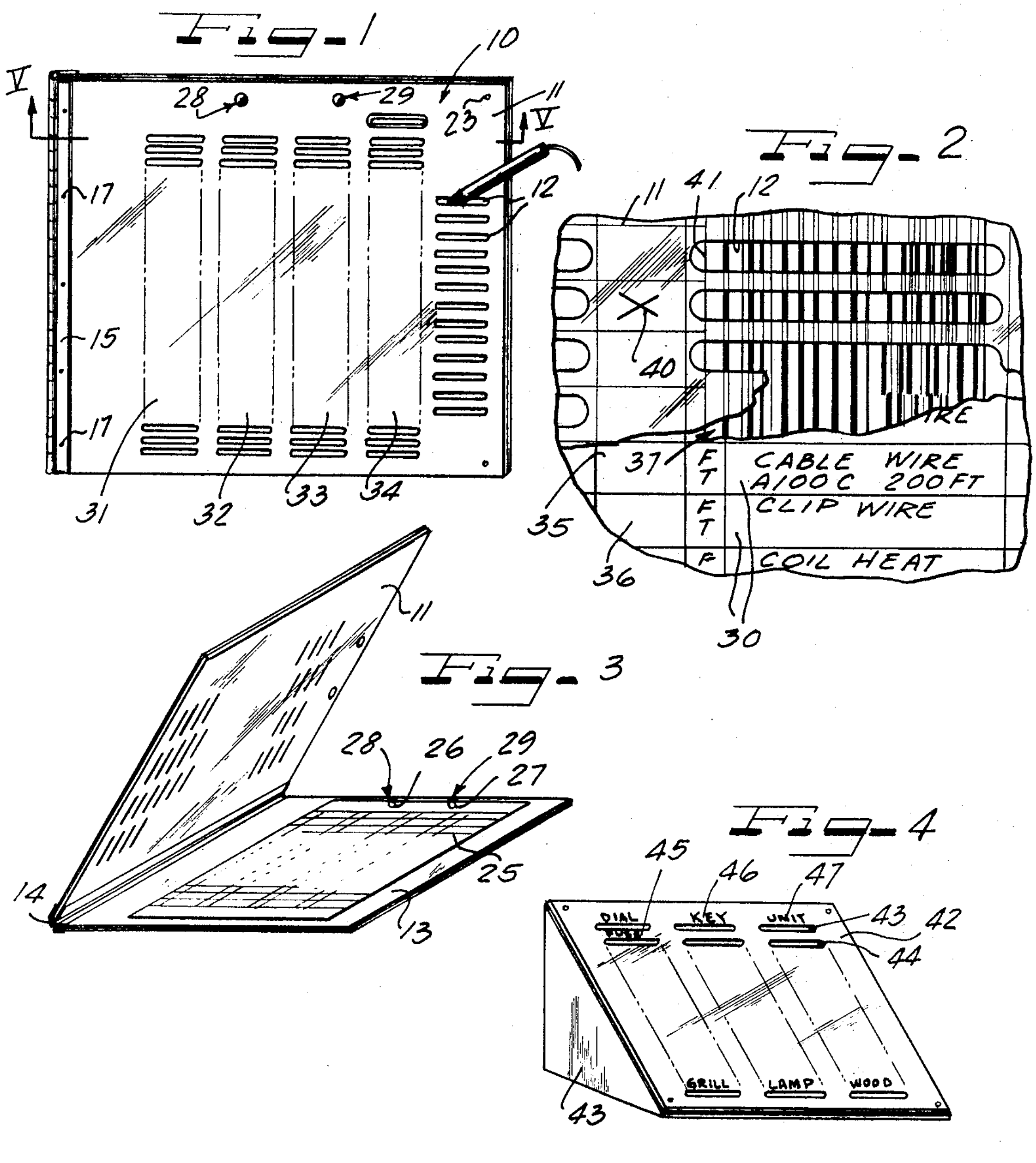
FIG. 1, is a top view of a bar code scanner template booklet according to the present invention showing the plurality of elongated windows arranged in columns and illustrating the use of a scanner in conjunction therewith.
FIG. 2, is a detail view of a portion of the front cover of the booklet of FIG. 1, illustrating both a positioning of the bar code label and also the positioning of a material order sheet beneath the bar code label with each item on the order sheet in alignment with the respective bar code label which is attached to the front cover.
FIG. 3, is a perspective view of the booklet of FIG. 1, showing the booklet in an open position and illustrating the locating of a material order list on a pair of pin guides attached to the back cover of the booklet.
FIG. 4, is a front view of another embodiment of the present invention wherein a transparent template is mounted on an easal and the material order list is permanently identified adjacent to each one of the bar codes rather than being removably positionable as shown in FIG. 3.

Referring to FIG. 1, a bar code label scanning booklet 10 has a front cover 11 formed of a transparent plastic material. This sheet 11 has a plurality of elongated slots 12 which form windows in the sheet 11. In this embodiment, the slots are actually punched through the sheet 11, although windows which are not punched through but are merely recesses in the sheet would function equivalently.

As shown in FIG. 3, the front cover 11 is secured to a rear cover 13 at a hinge 14. The hinge 14 may be connected to the front and rear covers by a plurality of methods, however, in this case, a pair of metallic strips 15 and 16 are riveted as at 17 and 18 to the flanges 19 and 20 of the hinge. In this way the hinge is securely fastened to the front and rear covers.

Figure 5:
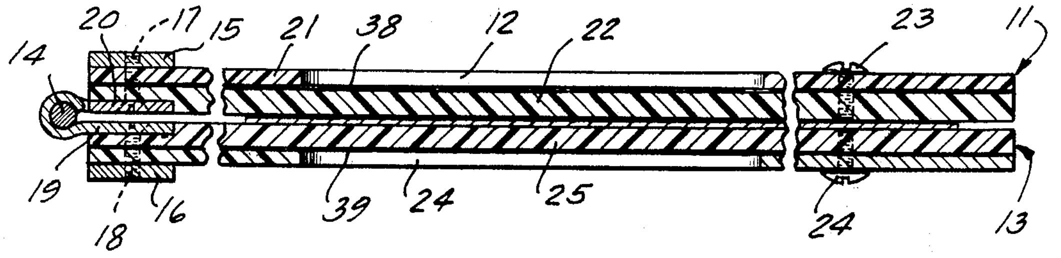
FIG. 5, is a section taken along the lines V—V of FIG. 1, illustrating the positioning of the various layers that comprise the scanning booklet including the bar code label and material order list inserts therein.

As shown in FIG. 5, the front cover 11 consists of a top planar sheet 21 and an inner sheet 22. The two sheets are secured together by the hinge arrangement just described and also by a rivet 23 at the outer most edge of the cover.

The back cover 13 is likewise comprised of an outer sheet 24 and an inner sheet 25. In a similar manner, the sheets 24 and 25 are secured at the hinge 14 and also at the edge of the book by a rivet 24. A material order list 25 is shown in FIG. 3 and comprises a sheet of paper having punched holes 26 and 27 which may be fit over a pair of pins 28 and 29. The pins are secured to the inner sheet 25 of the back cover 13. In this regard, it may be noted that the inner sheet of both the front and back cover is formed of a substantially thicker thermal plastic material than the outer sheet. This provides rigidity for the assembly, and in the case of the back cover, support for the pins 28 and 29.

The material order list is shown in greater detail in FIG. 2. The list has a series of items such as "cable wire," "clip wire," and "coil heat" listed in approximate quarter-inch wide rectangles 30. The rectangles are arranged in columns such as columns 31, 32, 33 and 34 of FIG. 1. Beside each rectangle is a blank rectangle, such as 35 and 36 in which a quantity to be ordered or a check mark may be inserted. When the material order list is positioned on the pins 28 and 29, the blank rectangles 35 and 36 are positioned between respective columns of windows in the cover of the template so that any entries made in the blank rectangles 35 and 36 will show through the cover.

As shown in FIG. 2 and FIG. 5, bar code label strips 37 are inserted between the two layers which form the front cover and similar strips such as 38 are inserted between the two layers which form the rear back cover. The strips are positioned beneath the column of windows, and a different bar code is located beneath different ones of the windows to indicate the subject material on the order list which is located directly beneath the bar code. Therefore, when the cover 11 is closed against the material order list, a bar code label will appear through a window which corresponds to the item on the material order list which is identified by that particular bar code. Accordingly, an X positioned in one of the blank rectangles such as at 40 will appear adjacent the proper bar code. The person entering the order then merely scans the window 41 located adjacent to the X, 40 in order to electronically enter the item being ordered. In place of an X, a quantity may be hand written, and the quantity then entered in the scanner by manual means or by scanning a quantity bar code located at a position positioned upon the booklet.

In operation, then, a paper material order list is filled out, placed over the pins 28 and 29 and the booklet closed. Those windows which have an indication such as an X placed adjacent to them are then optically scanned, and the order is automatically entered in a bulk data storage system.

It is noted that both the front and back covers are symmetrical, and that the material order list may be printed on both sides so that the booklet may first be scanned on the front cover and then turned over to be scanned on the back cover.

A further embodiment of the present invention is shown in FIG. 4, where a template 42 is shown as being secured to an easal 43. The template 42 has a plurality of windows such as 43 and 44 which are arranged in columns 45, 46 and 47. In this case, the indicia which is indicitive of the quantity or material to be ordered may be permanently printed adjacent to each respective bar code, and the item is merely scanned in the same manner as the scanning is done in the booklet of FIG. 1. In each case, the edges of the window provide a guide for the manually held scanner to increase the speed and accuracy of the data entry.

I claim as my invention:

1. A template for use with a bar code scanner comprising:

a substantially rigid and transparent planar sheet having a plurality of windows formed therein, a backing member adjacent and overlying each of said windows, said backing member having a bar code printed therein in such a manner as to generally coincide with the configuration of said respective windows, and means for locating alpha-numeric indicia adjacent to each of said bar codes so as to identify the respective codes, whereby said bar codes may be selectively scanned by inserting a scanner in a window chosen according to said indicia and using at least one edge of the window as a scanning guide.

2. A template in accordance with claim 1, wherein said means for locating alpha-numeric indicia adjacent to each of said bar codes comprises:

a separate sheet-like member for supporting said indicia and means for guidingly moving the separate member into and out of proximity with the backing member.

3. A template in accordance with claim 2, wherein said means for guidingly moving the separate sheet-like member into and out of proximity with the backing member comprises means for pivotally connecting the separate sheet-like member to the substantially rigid planar sheet whereby said sheet-like member and said planar member may be opened and closed in book-like manner.

4. A template in accordance with claim 3, wherein said separate sheet-like member has locating means for removably receiving and supporting a paper-like sheet with said alpha-numeric indicia printed therein, whereby an indicia bearing sheet may be placed against said separate sheet-like member and said sheet-like member may be closed in book-like manner against said substantially rigid transparent planar sheet to cause said indicia to appear through said transparent sheet in correct proximity with respective ones of said bar codes.

5. A template in accordance with claim 1, wherein said means for locating alpha-numeric indicia adjacent to said bar codes comprises means for fixedly mounting the alpha-numeric indicia directly adjacent to said windows whereby said bar codes may be permanently identified and scanned using at least one edge of the window as a scanning guide.

6. A template in accordance with claim 5, wherein substantially rigid and transparent planar sheet and said backing member are mounted to an easal frame for supporting the same in ready position to be easily scanned as desired.

7. A template booklet comprising a front and back cover hinged together at one edge, the front cover being at least one transparent sheet with a plurality of windows and having means for holding a backing member of printed bar codes against respective ones of the windows, the back cover being at least one substantially rigid sheet and having means for removably supporting printed indicia which when both covers are closed together identify the respective bar codes.

8. A template in accordance with claim 7, wherein the front cover comprises a pair of substantially rigid transparent sheets being held in proximity to each other in the form of a single cover but being unsecured to each other at the central regions thereof so that paper containing bar codes may be slipped into the space between the sheets and held in position beneath the respective windows formed in the front one of the two sheets.

9. A template in accordance with claim 8, wherein the back cover is formed similarly to the front cover.

* * * * *